(12) United States Patent
Farrinacci et al.

(10) Patent No.: US 8,743,738 B2
(45) Date of Patent: *Jun. 3, 2014

(54) TRIPLE-TIER ANYCAST ADDRESSING

(75) Inventors: Dino Farrinacci, San Jose, CA (US); Thomas James Edsall, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/584,546

(22) Filed: Aug. 13, 2012

(65) Prior Publication Data

US 2012/0300782 A1    Nov. 29, 2012

Related U.S. Application Data

(63) Continuation of application No. 11/670,544, filed on Feb. 2, 2007, now Pat. No. 8,259,720.

(51) Int. Cl.
*G06F 15/16* (2006.01)
*H04L 12/28* (2006.01)
*H04L 29/12* (2006.01)

(52) U.S. Cl.
CPC .................................. *H04L 61/103* (2013.01)
USPC .......................................... 370/254; 709/245

(58) Field of Classification Search
None
See application file for complete search history.

(56) References Cited

U.S. PATENT DOCUMENTS

| | | | |
|---|---|---|---|
| 5,402,416 A | 3/1995 | Cieslak et al. | |
| 5,526,350 A | 6/1996 | Gittins et al. | |
| 5,742,604 A | 4/1998 | Edsall et al. | |
| 5,920,566 A | 7/1999 | Hendel et al. | |
| 5,946,313 A | 8/1999 | Allan et al. | |
| 5,974,467 A | 10/1999 | Haddock et al. | |
| 5,987,011 A | 11/1999 | Toh | |
| 6,021,124 A | 2/2000 | Haartsen | |
| 6,104,699 A | 8/2000 | Holender et al. | |
| 6,195,356 B1 | 2/2001 | Anello et al. | |
| 6,201,789 B1 | 3/2001 | Witkowski et al. | |
| 6,249,820 B1* | 6/2001 | Dobbins et al. ............... 709/238 | |

(Continued)

FOREIGN PATENT DOCUMENTS

| | | |
|---|---|---|
| CN | 1778079 A | 5/2006 |
| EP | 1206099 | 5/2002 |

(Continued)

OTHER PUBLICATIONS

A.K. Choudry, et al., "A New Buffer Management Scheme for Hierarchical Shared Memory Switches", IEEE/ACM Transactions on Networking, 26 pp., 1997.

(Continued)

*Primary Examiner* — Timothy J Weidner

(57) ABSTRACT

In one embodiment, a solution is provided wherein redundant routers are treated as a single emulated switch. When a packet is received at a layer 2 edge switch from a host, the layer 2 edge switch may determine a switch identifier for the emulated switch using a destination anycast hardware address contained in the packet. The anycast hardware address may identify an emulated switch comprising a plurality of routers. Then a header may be added to the packet, the header including the switch identifier. Following that, the packet may be forwarded to another layer 2 switch along a shortest path from the layer 2 edge switch to the emulated switch.

20 Claims, 15 Drawing Sheets

(56) References Cited

U.S. PATENT DOCUMENTS

| | | |
|---|---|---|
| 6,333,917 B1 | 12/2001 | Lyon et al. |
| 6,363,477 B1 | 3/2002 | Fletcher et al. |
| 6,397,260 B1 | 5/2002 | Wils et al. |
| 6,404,768 B1 | 6/2002 | Basak et al. |
| 6,414,939 B1 | 7/2002 | Yamato |
| 6,456,590 B1 | 9/2002 | Ren et al. |
| 6,459,698 B1 | 10/2002 | Achrya |
| 6,504,836 B1 | 1/2003 | Li et al. |
| 6,529,489 B1 | 3/2003 | Kikuchi et al. |
| 6,556,541 B1 | 4/2003 | Bare |
| 6,556,578 B1 | 4/2003 | Silberschatz et al. |
| 6,560,198 B1 | 5/2003 | Ott et al. |
| 6,587,436 B1 | 7/2003 | Vu et al. |
| 6,636,524 B1 | 10/2003 | Chen et al. |
| 6,650,623 B1 | 11/2003 | Varma et al. |
| 6,657,974 B1* | 12/2003 | Britton et al. ............. 370/255 |
| 6,671,258 B1 | 12/2003 | Bonneau |
| 6,675,206 B1* | 1/2004 | Britton et al. ............. 709/220 |
| 6,678,725 B1* | 1/2004 | Britton et al. ............. 709/220 |
| 6,721,316 B1 | 4/2004 | Epps et al. |
| 6,724,725 B1 | 4/2004 | Dreyer et al. |
| 6,839,794 B1 | 1/2005 | Schober |
| 6,839,858 B1 | 1/2005 | James et al. |
| 6,885,633 B1 | 4/2005 | Mikkonen |
| 6,888,824 B1 | 5/2005 | Fang et al. |
| 6,901,593 B2 | 5/2005 | Aweya et al. |
| 6,904,507 B2 | 6/2005 | Gil |
| 6,922,408 B2 | 7/2005 | Bloch et al. |
| 6,934,256 B1 | 8/2005 | Jacobson et al. |
| 6,934,292 B1* | 8/2005 | Ammitzboell ............. 370/400 |
| 6,975,581 B1 | 12/2005 | Medina et al. |
| 6,975,593 B2 | 12/2005 | Collier et al. |
| 6,990,529 B2 | 1/2006 | Yang et al. |
| 6,999,462 B1 | 2/2006 | Acharya |
| 7,016,971 B1 | 3/2006 | Recio et al. |
| 7,020,715 B2 | 3/2006 | Venkataraman et al. |
| 7,046,631 B1 | 5/2006 | Giroux et al. |
| 7,046,666 B1* | 5/2006 | Bollay et al. ............. 370/392 |
| 7,047,666 B2 | 5/2006 | Hahn et al. |
| 7,055,173 B1* | 5/2006 | Chaganty et al. ............. 726/11 |
| 7,093,024 B2 | 8/2006 | Craddock et al. |
| 7,133,405 B2 | 11/2006 | Graham et al. |
| 7,133,416 B1 | 11/2006 | Chamdani |
| 7,158,480 B1 | 1/2007 | Firoiu et al. |
| 7,187,688 B2 | 3/2007 | Garmire et al. |
| 7,190,667 B2 | 3/2007 | Susnow et al. |
| 7,197,047 B2 | 3/2007 | Latif et al. |
| 7,209,478 B2 | 4/2007 | Rojas et al. |
| 7,209,489 B1 | 4/2007 | Bailey et al. |
| 7,221,656 B1 | 5/2007 | Aweya et al. |
| 7,225,364 B2 | 5/2007 | Carnevale et al. |
| 7,254,636 B1* | 8/2007 | O'Toole et al. ............. 709/230 |
| 7,266,122 B1 | 9/2007 | Hogg et al. |
| 7,266,598 B2 | 9/2007 | Rolia |
| 7,277,391 B1 | 10/2007 | Aweya et al. |
| 7,286,485 B1 | 10/2007 | Oulette et al. |
| 7,319,669 B1 | 1/2008 | Kunz et al. |
| 7,349,334 B2 | 3/2008 | Rider |
| 7,349,336 B2 | 3/2008 | Mathews et al. |
| 7,359,321 B1 | 4/2008 | Sindhu et al. |
| 7,385,997 B2 | 6/2008 | Gorti et al. |
| 7,400,590 B1 | 7/2008 | Rygh et al. |
| 7,400,634 B2 | 7/2008 | Higashitaniguchi et al. |
| 7,406,092 B2 | 7/2008 | Dropps et al. |
| 7,436,845 B1 | 10/2008 | Rygh et al. |
| 7,478,173 B1* | 1/2009 | Delco ............. 709/250 |
| 7,480,737 B2* | 1/2009 | Chauffour et al. ............. 709/245 |
| 7,486,689 B1 | 2/2009 | Mott |
| 7,525,983 B2 | 4/2009 | Dropps et al. |
| 7,529,243 B2 | 5/2009 | Sodder et al. |
| 7,561,571 B1 | 7/2009 | Lovett et al. |
| 7,564,789 B2 | 7/2009 | Betker |
| 7,564,869 B2 | 7/2009 | Cafiero et al. |
| 7,596,627 B2 | 9/2009 | Cometto et al. |
| 7,602,720 B2 | 10/2009 | Bergamasco et al. |
| 7,673,061 B2* | 3/2010 | Nubani et al. ............. 709/230 |
| 7,684,326 B2 | 3/2010 | Nation et al. |
| 7,801,125 B2 | 9/2010 | Kreeger et al. |
| 7,830,793 B2 | 11/2010 | Gai et al. |
| 7,881,208 B1* | 2/2011 | Nosella et al. ............. 370/242 |
| 7,961,621 B2 | 6/2011 | Bergamasco et al. |
| 7,969,971 B2 | 6/2011 | Gai et al. |
| 8,001,269 B1* | 8/2011 | Satapati et al. ............. 709/245 |
| 8,121,038 B2 | 2/2012 | Bergamasco et al. |
| 8,149,710 B2 | 4/2012 | Bergamasco et al. |
| 8,160,094 B2 | 4/2012 | Cafiero et al. |
| 8,238,347 B2 | 8/2012 | DeSanti et al. |
| 8,259,720 B2* | 9/2012 | Farinacci et al. ............. 370/392 |
| 2001/0043564 A1 | 11/2001 | Bloch et al. |
| 2001/0048661 A1 | 12/2001 | Clear et al. |
| 2002/0016860 A1* | 2/2002 | Garcia-Luna-Aceves et al. ............. 709/245 |
| 2002/0023150 A1* | 2/2002 | Osafune et al. ............. 709/221 |
| 2002/0046271 A1 | 4/2002 | Huang |
| 2002/0085493 A1 | 7/2002 | Pekkala et al. |
| 2002/0085565 A1 | 7/2002 | Ku et al. |
| 2002/0103631 A1 | 8/2002 | Feldmann et al. |
| 2002/0141427 A1 | 10/2002 | McAlpine |
| 2002/0150041 A1 | 10/2002 | Reinschmidt et al. |
| 2002/0156612 A1* | 10/2002 | Schulter et al. ............. 703/23 |
| 2002/0156613 A1* | 10/2002 | Geng et al. ............. 703/23 |
| 2002/0159385 A1 | 10/2002 | Susnow et al. |
| 2002/0188648 A1 | 12/2002 | Aweya et al. |
| 2002/0191640 A1 | 12/2002 | Haymes et al. |
| 2003/0002517 A1 | 1/2003 | Takajitsuko et al. |
| 2003/0026267 A1 | 2/2003 | Oberman et al. |
| 2003/0037127 A1 | 2/2003 | Shah et al. |
| 2003/0037163 A1 | 2/2003 | Kitada et al. |
| 2003/0037165 A1* | 2/2003 | Shinomiya ............. 709/238 |
| 2003/0061379 A1 | 3/2003 | Craddock et al. |
| 2003/0084219 A1 | 5/2003 | Yao et al. |
| 2003/0091037 A1 | 5/2003 | Latif et al. |
| 2003/0108052 A1* | 6/2003 | Inoue et al. ............. 370/399 |
| 2003/0115355 A1 | 6/2003 | Cometto et al. |
| 2003/0118030 A1 | 6/2003 | Fukuda |
| 2003/0152034 A1 | 8/2003 | Zhang et al. |
| 2003/0152063 A1 | 8/2003 | Giese et al. |
| 2003/0169690 A1 | 9/2003 | Mott |
| 2003/0193942 A1 | 10/2003 | Gil |
| 2003/0195983 A1 | 10/2003 | Krause |
| 2003/0202536 A1 | 10/2003 | Foster et al. |
| 2003/0223416 A1 | 12/2003 | Rojas et al. |
| 2003/0225549 A1 | 12/2003 | Shay |
| 2003/0227893 A1 | 12/2003 | Bajic |
| 2004/0006705 A1 | 1/2004 | Walker |
| 2004/0008675 A1 | 1/2004 | Basso et al. |
| 2004/0013088 A1 | 1/2004 | Gregg |
| 2004/0013124 A1 | 1/2004 | Peebles et al. |
| 2004/0024903 A1 | 2/2004 | Costatino et al. |
| 2004/0032856 A1 | 2/2004 | Sandstrom |
| 2004/0042448 A1 | 3/2004 | Lebizay et al. |
| 2004/0042477 A1 | 3/2004 | Bitar et al. |
| 2004/0076175 A1 | 4/2004 | Patenaude |
| 2004/0078621 A1 | 4/2004 | Talaugon et al. |
| 2004/0081203 A1 | 4/2004 | Sodder et al. |
| 2004/0100980 A1 | 5/2004 | Jacobs et al. |
| 2004/0120332 A1 | 6/2004 | Hendel |
| 2004/0156390 A1 | 8/2004 | Prasad et al. |
| 2004/0196809 A1 | 10/2004 | Dillinger et al. |
| 2004/0213243 A1 | 10/2004 | Lin et al. |
| 2004/0215752 A1* | 10/2004 | Satapati et al. ............. 709/223 |
| 2004/0240459 A1 | 12/2004 | Lo et al. |
| 2005/0002329 A1 | 1/2005 | Luft et al. |
| 2005/0018606 A1 | 1/2005 | Dropps et al. |
| 2005/0025051 A1* | 2/2005 | Roeder ............. 370/230 |
| 2005/0025179 A1 | 2/2005 | McLaggan et al. |
| 2005/0047421 A1 | 3/2005 | Solomon |
| 2005/0060445 A1 | 3/2005 | Beukema et al. |
| 2005/0074015 A1* | 4/2005 | Chari et al. ............. 370/400 |
| 2005/0104217 A1 | 5/2005 | Lehave |
| 2005/0105474 A1 | 5/2005 | Metzler |
| 2005/0111487 A1 | 5/2005 | Matta et al. |
| 2005/0138243 A1 | 6/2005 | Tierney et al. |
| 2005/0141419 A1 | 6/2005 | Bergamasco et al. |

(56) References Cited

U.S. PATENT DOCUMENTS

| | | | |
|---|---|---|---|
| 2005/0141568 A1 | 6/2005 | Kwak et al. | |
| 2005/0152406 A2 | 7/2005 | Chauveau | |
| 2005/0169188 A1 | 8/2005 | Cometto et al. | |
| 2005/0169270 A1 | 8/2005 | Mutuo et al. | |
| 2005/0190752 A1 | 9/2005 | Chiou et al. | |
| 2005/0226149 A1 | 10/2005 | Jacobson et al. | |
| 2005/0238064 A1 | 10/2005 | Winter et al. | |
| 2005/0286436 A1 | 12/2005 | Flask | |
| 2006/0002385 A1 | 1/2006 | Johnsen et al. | |
| 2006/0023708 A1 | 2/2006 | Snively et al. | |
| 2006/0059213 A1 | 3/2006 | Evoy | |
| 2006/0087989 A1 | 4/2006 | Gai et al. | |
| 2006/0098589 A1 | 5/2006 | Kreeger et al. | |
| 2006/0098681 A1 | 5/2006 | Cafiero et al. | |
| 2006/0101140 A1 | 5/2006 | Gai et al. | |
| 2006/0104218 A1 | 5/2006 | Kako | |
| 2006/0129695 A1* | 6/2006 | Faibish et al. | 709/245 |
| 2006/0146832 A1 | 7/2006 | Rampal et al. | |
| 2006/0171318 A1 | 8/2006 | Bergamasco et al. | |
| 2006/0187832 A1 | 8/2006 | Yu | |
| 2006/0187900 A1 | 8/2006 | Akbar | |
| 2006/0198323 A1 | 9/2006 | Finn | |
| 2006/0215550 A1 | 9/2006 | Malhotra | |
| 2006/0251067 A1 | 11/2006 | DeSanti et al. | |
| 2006/0274791 A1 | 12/2006 | Garcia et al. | |
| 2007/0041321 A1 | 2/2007 | Sasaki et al. | |
| 2007/0047443 A1 | 3/2007 | Desai et al. | |
| 2007/0081454 A1 | 4/2007 | Bergamasco et al. | |
| 2007/0115824 A1 | 5/2007 | Chandra et al. | |
| 2007/0121617 A1 | 5/2007 | Kanekar et al. | |
| 2007/0183332 A1 | 8/2007 | Oh et al. | |
| 2008/0019282 A1 | 1/2008 | Alaria et al. | |
| 2008/0069114 A1 | 3/2008 | Shimada et al. | |
| 2008/0080512 A1* | 4/2008 | Gofman et al. | 370/392 |
| 2008/0089247 A1 | 4/2008 | Sane et al. | |
| 2008/0117938 A1 | 5/2008 | Erich et al. | |
| 2008/0144532 A1* | 6/2008 | Chamarajanagar et al. | 370/255 |
| 2008/0144634 A1* | 6/2008 | Chamarajanagar et al. | 370/397 |
| 2008/0186968 A1 | 8/2008 | Farinacci et al. | |
| 2008/0212595 A1 | 9/2008 | Figueira et al. | |
| 2008/0235400 A1* | 9/2008 | Slocombe et al. | 709/245 |
| 2008/0259798 A1 | 10/2008 | Loh et al. | |
| 2008/0273465 A1 | 11/2008 | Gusat et al. | |
| 2009/0010162 A1 | 1/2009 | Bergamasco et al. | |
| 2009/0052326 A1 | 2/2009 | Bergamasco et al. | |
| 2009/0073882 A1 | 3/2009 | McAlpine et al. | |
| 2009/0232138 A1 | 9/2009 | Gobara et al. | |
| 2009/0252038 A1 | 10/2009 | Cafiero et al. | |
| 2011/0007741 A1 | 1/2011 | Kreeger et al. | |

FOREIGN PATENT DOCUMENTS

| | | |
|---|---|---|
| WO | WO 2004/064324 | 7/2004 |
| WO | WO 2006/047092 | 5/2006 |
| WO | WO 2006/047109 | 5/2006 |
| WO | WO 2006/047194 | 5/2006 |
| WO | WO 2006/047223 | 5/2006 |
| WO | WO 2006/057730 | 6/2006 |
| WO | WO 2006/063922 | 6/2006 |
| WO | WO 2007/050250 | 5/2007 |
| WO | WO 2008/097730 | 1/2008 |

OTHER PUBLICATIONS

A.K. Choudry, et al., "Dynamic Queue Length Thresholds for Shared-Memory Packet Switches", IEEE/ACM Transactions on Networking, Apr. 1998.

Cisco Systems, Inc., "Cisco Data Center Network Architecture and Solutions Overview," http://www.cisco.com/application/pdf/en/us/guest/netsol/ns377/c643/cdccont_0900aecd802c9a4f.pdf, 2006.

F. Kamoun, et al., "Analysis of Shared Finite Storage in a Computer Network Node Environment Under General Traffic Conditions", IEEE Transactions on Communications, Jul. 1990.

Floyd et al., Random Early Detection Gateways for Congestion Avoidance, Lawrence Berkeley Laboratory, Univ. of California, IEEE/ACM Transactions on Networking, Aug. 1993, 22 pages.

IEEE Standards 802.3ah™—2004, IEEE Computer Society, Sep. 7, 2004, 623 pages.

IEEE Standards 802.3ak™—2004, IEEE Computer Society, Mar. 1, 2004, 52 pages.

IEEE Standards 802.3™—2002, IEEE Computer Society, Mar. 8, 2002, 1538 pages.

InfiniBand Arch, Spec, vol. 1. Oct. 24, 2000 Final. Infiniband SM Trade Association.

InfiniBand Arch, Spec, vol. 2. Oct. 24, 2000 Final. Infiniband SM Trade Association.

J. Mandavi, et al., "IPPM Metrics for Measuring Connectivity", RFC 2678, pp. 1-9, Sep. 1999.

J. Moy, OSPF Version 2 (RFC 2178), Network Working Group, Cascade Communications Corp., Jul. 1997, 211 pp.

J. Postel, "Internet Control Message Protocol, DARPA Internet Program Protocol Specification", RFC 792, pp. 1-15, Sep. 1981.

K. Ramakrishnan et al., "The Addition of Explicit Congestion Notification (ECN) to *IP*," RFC 3168, Sep. 2001.

MAC Control, IEEE Std 802.3-2002, Section Two, 9 pages.

MAC Control PAUSE Operation, 31B.1 PAUSE description, Annex 31B, IEEE Std 802.3, 1998 Edition, 11 pages.

MAC Control PAUSE Operation, 31B.3.1 Transmit Operation, Annex 31B, IEEE Std 802.3ae-2002, 4 pages.

Mekkittikul et al., A Practical Scheduling Algorithm to Achieve 100% Throughput in Input-Queued Switches, Computer Systems Laboratory, Stanford University, 1998, 8 pages.

Sancho et al.; "Analyzing the Influence of Virtual Lanes on the Performance on Infiniband Networks"; 2002; IEEE Proceeding of the International Parallel and Disctributed processing Symposium (IPDPS'02); pp. 1-10.

Wei Cao Huawei Technologies: "IEEE 802.1ah Mode for Ethernet Over MPLS; draft-cao-pwe3-801-1ah-00.txt" IETF Standard-Working-Draft, Internet Engineering Task Force, IETF, CH, Oct. 16, 2006, XP015047518 ISSN: 000-0004.

International Search Report and Written Opinion, dated Sep. 21, 2006, from PCT/US05/37069.

International Search Report and Written Opinion, dated Feb. 20, 2007, from PCT/US05/37651.

International Search Report and Written Opinion, dated Jun. 4, 2008, PCT/US2007/066027.

International Search Report and Written Opinion, dated Jan. 16, 2007, from PCT/US05/37239.

International Search Report and Written Opinion, dated Oct. 18, 2006, from PCT/US05/37765.

International Search Report and Written Opinion, dated Nov. 1, 2006, from PCT/US05/36700.

International Search Report and Written Opinion, dated Sep. 27, 2007, from PCT/US06/38858.

International Search Report and Written Opinion, dated May 23, 2008, from PCT/US08/051986.

CN Office Action mailed Jul. 31, 2009, in Chinese Application No. 200580034647.5.

CN Second Office Action mailed Feb. 5, 2010, in Chinese Application No. 200580034647.5.

CN Third Office Action mailed Aug. 11, 2010, in Chinese Application No. 200580034647.5.

CN Fourth Office Action mailed Jan. 10, 2011, in Chinese Application No. 200580034647.5.

CN Office Action mailed Aug. 8, 2008, in Chinese Application No. 200580035946.

CN Second Office Action mailed Feb. 27, 2009, in Chinese Application No. 200580035946.

CN Office Action mailed Jul. 18, 2008, in Chinese Application No. 200580034646.0.

CN Second Office Action mailed Jan. 15, 2010, in Chinese Application No. 200580034646.0.

CN Third Office Action mailed Jul. 6, 2011, in Chinese Application No. 200580034646.0.

CN Fourth Office Action mailed Dec. 31, 2011, in Chinese Application No. 200580034646.0.

(56) References Cited

OTHER PUBLICATIONS

CN First Office Action mailed Feb. 12, 2010, in Chinese Application No. 200580034955.8.
CN Second Office Action mailed Aug. 11, 2010, in Chinese Application No. 200580034955.8.
CN Third Office Action mailed Dec. 3, 2010, in Chinese Application No. 200580034955.8.
CN First Office Action mailed Aug. 18, 2011 in Chinese Application No. 200880003496.0.
CN Office Action mailed Jan. 18, 2012 in Chinese Application No. 200880003496.0.
EPO Extended Search Report mailed Jun. 1, 2011 in EP Application No. 05812799.4.
EPO Extended Search Report mailed Jul. 16, 2009, in EP Application No. 05810244.3.
EPO Office Action mailed Oct. 1, 2009, in EP Application No. 05810244.3.
EPO Office Action mailed Apr. 12, 2011, in EP Application No. 05810244.3.
Nothing to report as of Aug. 26, 2011.
EPO Extended Search Report mailed Jul. 13, 2009, in EP Application No. 05810800.2.
EPO Office Action mailed Oct. 19, 2009, in EP Application No. 05810800.2.
EPO Office Action mailed May 19, 2011, in EP Application No. 05810800.2.
EPO Search Report mailed Mar. 19, 2010, in EP Application No. 08728248.9.
EPO Office Action mailed Jun. 18, 2010, in EP Application No. 08728248.9.
EPO Office Action mailed Nov. 18, 2011, in EP Application No. 08728248.9.
US Office Action mailed Mar. 31, 2008 in related U.S. Appl. No. 11/084,587.
US Office Action mailed Oct. 28, 2008 in related U.S. Appl. No. 11/084,587.
US Office Action mailed Apr. 22, 2009 in related U.S. Appl. No. 11/084,587.
US Office Action mailed Nov. 23, 2009 in related U.S. Appl. No. 11/084,587.
US Office Action mailed Jun. 24, 2010 in related U.S. Appl. No. 11/084,587.
US Final Office Action mailed Nov. 26, 2010 in related U.S. Appl. No. 11/084,587.
US Notice of Allowance mailed Feb. 22, 2011, in related U.S. Appl. No. 11/084,587.
US Office Action mailed Jan. 30, 2008 in related U.S. Appl. No. 11/078,992.
US Final Office Action mailed Jul. 11, 2008 in related U.S. Appl. No. 11/078,992.
US Office Action mailed Oct. 23, 2008 in related U.S. Appl. No. 11/078,992.
US Notice of Allowance mailed Mar. 23, 2009 in related U.S. Appl. No. 11/078,992.
US Office Action mailed Jul. 3, 2008 in related U.S. Appl. No. 11/400,671.
US Final Office Action mailed Mar. 17, 2009 in related U.S. Appl. No. 11/400,671.
US Office Action mailed Jun. 22, 2009 in related U.S. Appl. No. 11/400,671.
US Office Action mailed Dec. 9, 2009 in related U.S. Appl. No. 11/400,671.
US Final Office Action mailed Jun. 11, 2010 in related U.S. Appl. No. 11/400,671.
US Office Action mailed Mar. 17, 2011 in related U.S. Appl. No. 11/400,671.
US Final Office Action mailed Sep. 16, 2011 in related U.S. Appl. No. 11/400,671.
US Office Action mailed Dec. 22, 2011 in related U.S. Appl. No. 11/400,671.
US Office Action mailed Apr. 13, 2011 in related U.S. Appl. No. 12/485,337.
US Notice of Allowance mailed Aug. 26, 2011 in related U.S. Appl. No. 12/485,337.
US Notice of Allowance mailed Dec. 13, 2011 in related U.S. Appl. No. 12/485,337.
US Office Action mailed Feb. 21, 2008 in related U.S. Appl. No. 11/094,877.
US Office Action mailed Jul. 28, 2008 in related U.S. Appl. No. 11/094,877.
US Final Office Action mailed Dec. 10, 2008 in related U.S. Appl. No. 11/094,877.
US Office Action mailed Apr. 7, 2009 in related U.S. Appl. No. 11/094,877.
US Office Action mailed Nov. 4, 2009 in related U.S. Appl. No. 11/094,877.
US Notice of Allowance mailed Apr. 23, 2010 in related U.S. Appl. No. 11/094,877.
US Notice of Allowance mailed Jun. 28, 2010 in related U.S. Appl. No. 11/094,877.
US Office Action mailed Jan. 24, 2008 in related U.S. Appl. No. 11/152,991.
US Final Office Action mailed Sep. 8, 2008 in related U.S. Appl. No. 11/152,991.
US Office Action mailed Mar. 4, 2009 in related U.S. Appl. No. 11/152,991.
US Final Office Action mailed Aug. 18, 2009 in related U.S. Appl. No. 11/152,991.
US Notice of Allowance mailed Dec. 31, 2009 in related U.S. Appl. No. 11/152,991.
US Notice of Allowance mailed May 17, 2010 in related U.S. Appl. No. 11/152,991.
US Office Action mailed May 29, 2008 in related U.S. Appl. No. 11/155,388.
US Final Office Action mailed Sep. 15, 2008 in related U.S. Appl. No. 11/155,388.
US Notice of Allowance mailed May 29, 2009 in related U.S. Appl. No. 11/155,388.
US Notice of Allowance mailed Jul. 17, 2009 in related U.S. Appl. No. 11/155,388.
US Office Action mailed May 14, 2009 in related U.S. Appl. No. 11/248,933.
US Final Office Action mailed Dec. 28, 2009 in related U.S. Appl. No. 11/248,933.
US Office Action mailed May 13, 2010 in related U.S. Appl. No. 11/248,933.
US Notice of Allowance mailed Oct. 8, 2010 in related U.S. Appl. No. 11/248,933.
US Notice of Allowance mailed Feb. 4, 2011, in related U.S. Appl. No. 11/248,933.
US Office Action mailed Apr. 15, 2009 in related U.S. Appl. No. 11/670,544.
US Final Office Action mailed Oct. 22, 2009 in related U.S. Appl. No. 11/670,544.
US Notice of Allowance mailed Nov. 18, 2011 in related U.S. Appl. No. 11/670,544.
US Office Action mailed Oct. 19, 2009 in related U.S. Appl. No. 11/825,631.
US Office Action mailed Apr. 28, 2010 in related U.S. Appl. No. 11/825,631.
US Office Action mailed Oct. 29, 2010 in related U.S. Appl. No. 11/825,631.
US Office Action mailed May 26, 2011 in related U.S. Appl. No. 11/825,631.
US Notice of Allowance mailed Nov. 25, 2011 in related U.S. Appl. No. 11/825,631.
US Office Action mailed Oct. 19, 2009 in related U.S. Appl. No. 11/842,866.
US Final Office Action mailed Apr. 2, 2010 in related U.S. Appl. No. 11/842,866.
US Office Action mailed Oct. 29, 2010 in related U.S. Appl. No. 11/842,866.

(56) References Cited

OTHER PUBLICATIONS

US Office Action mailed May 27, 2011 in related U.S. Appl. No. 11/842,866.

US Notice of Allowance mailed Oct. 7, 2011 in related U.S. Appl. No. 11/842,866.

* cited by examiner

TRIPLE-TIER ANYCAST ADDRESSING

RELATED APPLICATIONS

This application is a continuation application and claims priority from U.S. patent application Ser. No. 11/670,544, entitled "TRIPLE-TIER ANYCAST ADDRESSING," by Farinacci et al, filed on Feb. 2, 2007, which is hereby incorporated by reference for all purposes.

BACKGROUND OF THE INVENTION

1. Technical Field

The present invention relates to computer networking.

2. Description of the Related Art

Data management within organizations is an ever increasing concern, especially with the rise of the Internet information age. The heart of this data management function is sometimes known as a data center. Over the last decade, data centers have evolved into the strategic focus of Information Technology (IT) efforts to protect, optimize, and grow the organization.

DESCRIPTION OF EXAMPLE EMBODIMENTS

Overview

In one embodiment, a solution is provided wherein redundant routers are treated as a single emulated switch. When a packet is received at a layer 2 edge switch from a host, the layer 2 edge switch may determine a switch identifier for the emulated switch using a destination anycast hardware address contained in the packet. The anycast hardware address may identify an emulated switch comprising a plurality of routers. Then a header may be added to the packet, the header including the switch identifier. Following that, the packet may be forwarded to another layer 2 switch along a shortest path from the layer 2 edge switch to the emulated switch.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

Figure 1:
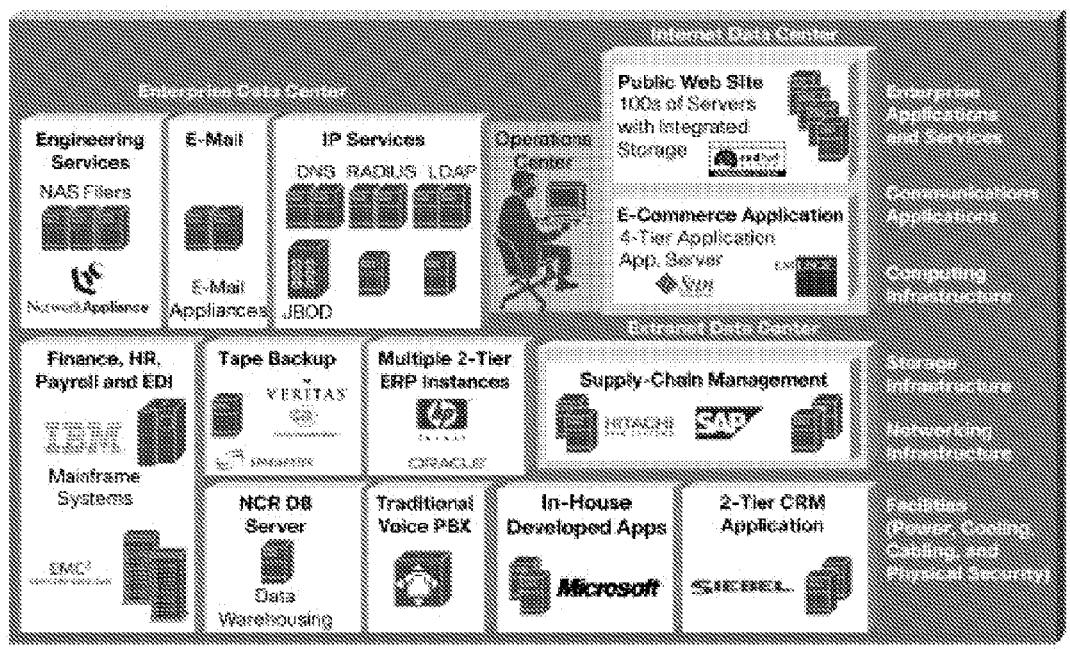
FIG. 1 illustrates an "isolated application" environment.

Data center managers face several challenges in fulfilling the goals of data centers. Most enterprise data centers grew rapidly to meet the explosive economic growth of recent times. Consequently, applications commonly stand alone in underutilized, isolated infrastructure silos. Each infrastructure silo is designed based on the inclination of the specific application being deployed, so that a typical data center supports a broad assortment of operating systems, computing platforms, and storage systems. The disparate infrastructures supporting different application "islands" are difficult to change or expand and expensive to manage, integrate, secure, and back up. FIG. 1 illustrates an "isolated application" environment.

Figure 2:
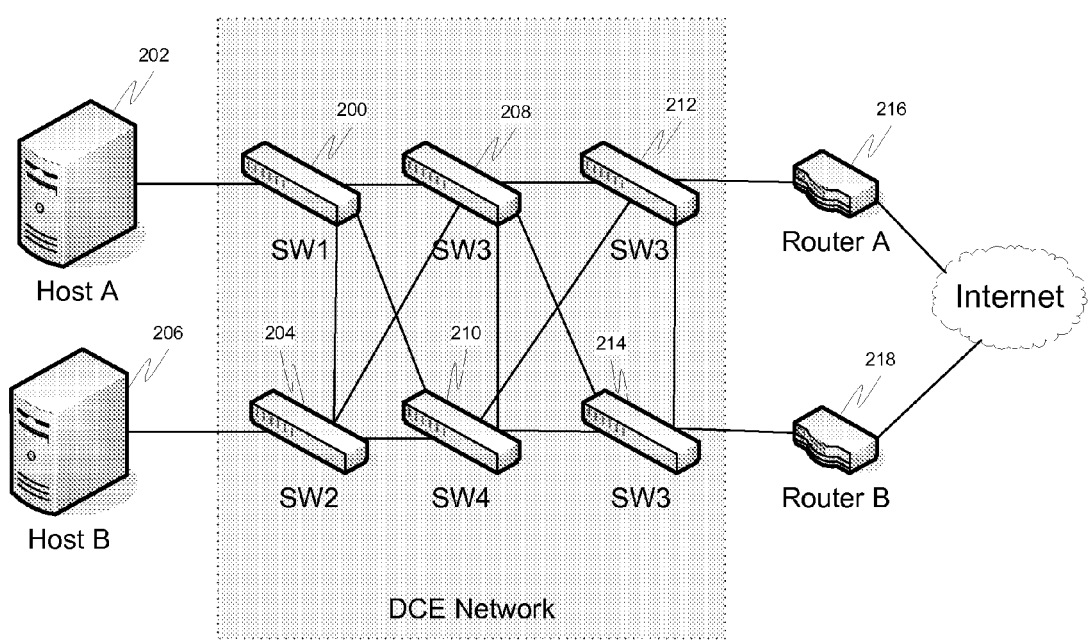
FIG. 2 illustrates a DCE network.

One solution to this problem is to design a data center environment that is highly scalable, resilient, secure, and able to integrate multiple applications and protocols. One such solution is known as the Data Center Network Architecture. A specific implementation of the Data Center Network Architecture is known as Data Center Ethernet (DCE). DCE allows for consolidation of input and output, and improved forwarding of communications within the network. This may be accomplished via specialized protocols and functionality operated by switches within a DCE network via network layer 2. Each of the switches within the DCE network may be a layer 2 device. FIG. 2 illustrates a DCE network. Edge switch 200 may be connected to a host 202. Edge switch 204 may be connected to host 206. Edge switches 200, 204 may then be connected to several core switches 208, 210, which then may be connected to other edge switches 212, 214. Each DCE switch may be assigned a unique identifier. A routing protocol, such as Intermediate-System-to-Intermediate-System (IS-IS), may be used inside DCE. Edge switches implementing this routing protocol may append information to packets sent though the DCE. This appended information may be in the form of a MAC-in-MAC header attached to the packet. Edge switches 212, 214 may then each be connected to layer 3 devices, such as routers 216, 218. Rather than forwarding packets to MAC addresses, DCE switches send packets to edge switches based on the edge switch identification via the MAC-in-MAC header. The edge switch then knows which of its ports to send the packet out to arrive at the correct IP address (for example, the port connected to router 216), and strips off the MAC-in-MAC header prior to doing so.

Rather than operate routers 216 and 218 independently, it is often beneficial to link the routers so that one router can act as a backup to the other router in case of router or link failure. This linking may be accomplished via another routing protocol, such as Hot Standby Routing Protocol (HSRP). Other hot standby routing protocols include Virtual Router Redundancy Protocol (VRRP) and Gateway Load Balancing Protocol (GLBP). In these protocols, several routers are connected to the same subnet of a network and work together to present the appearance of a single virtual router. Typically, a single virtual IP address is assigned to the routers, which the links to a single virtual MAC address. The single virtual MAC address, however, points to a particular one of the routers, designated as the "active" router, whereas the other router(s) are designated as "backup." If one router goes down, another takes over and the virtual MAC address is mapped to the backup router. However, while both are running, only one is being used for outbound communications. This can be inefficient for several reasons.

First of all, using just one of a plurality of redundant routers as the active router for outbound communications can create a bottleneck at the single router or on one of its associated links. It would be much more efficient to load balance between the redundant routers. Second of all, even if a hot routing protocol is utilized to load balance between redundant routers, the traffic generated by these protocols can be wasteful. Third of all, the amount of time for a router to switch from active to backup is non-trivial. If faster convergence is desired, a different solution is required.

A solution is provided wherein the redundant routers are treated as a single emulated switch. This allows for both a failure recovery and a load-balancing mechanism for host-switch-router connectivity through a protocol, such as DCE, used in network containing layer 2 switches. Through the use of this solution, hot standby routing protocols such as HSRP, VRRP, and GLBP can be eliminated.

Configuration of the network may be accomplished by first assigning the same IP address to all routers in the emulated switch. This IP address may be known as the "router anycast address." Additionally, the same MAC address may be assigned to all routers in the emulated switch. This MAC address may be known as a "router anycast MAC address." Each host may then be configured with a default router using a virtual IP address. The virtual IP address maps to a virtual MAC address. The virtual MAC addresses for the routers in the virtual switch correspond to a single anycast hardware address. The anycast hardware address may be used as a switch identification. This switch identification may be advertised to all layer 2 switches within the network using a protocol such as IS-IS, RIP, or (EIGRP) as long as the edge switches have a reachable connection to the router.

Figure 3:
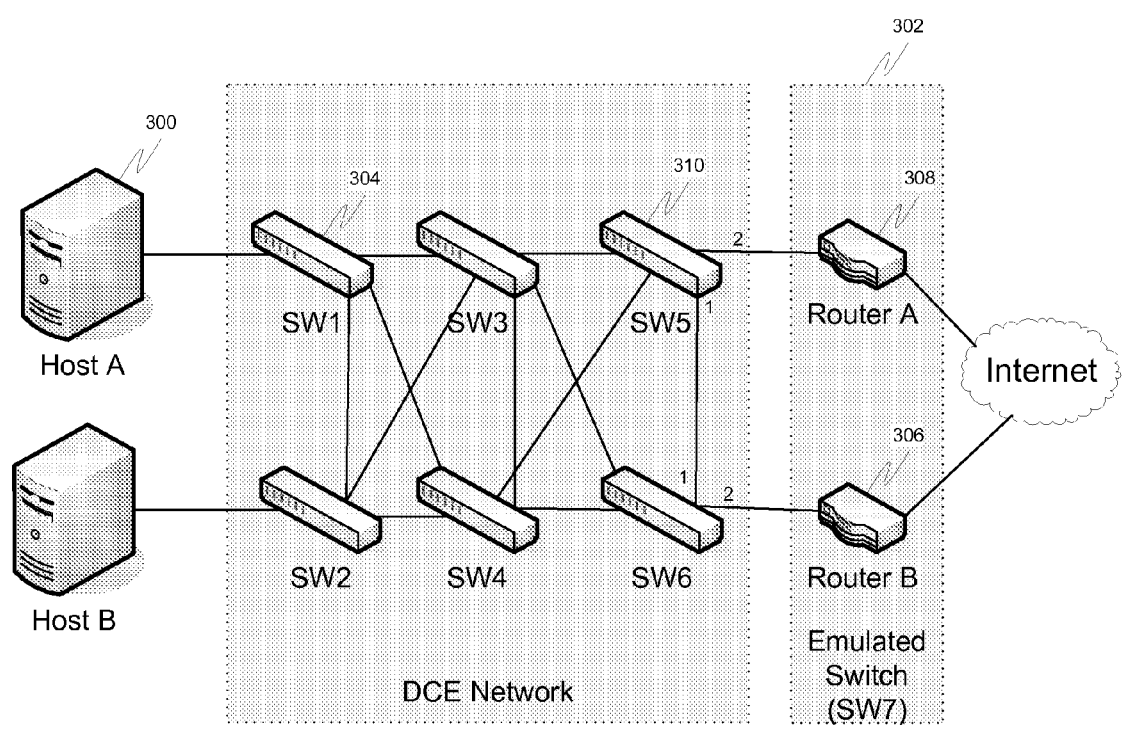
FIG. 3 illustrates an example network containing layer 2 switches coupled to an emulated switch.

FIG. 3 illustrates an example network containing layer 2 switches coupled to an emulated switch. When a packet is to be sent from a host 300 to a network, such as the Internet, coupled to the emulated switch 302, it may forward the packet to the closest edge switch 304. However, this host 300 does not have a MAC address of a default router in its memory, such as an address resolution protocol (ARP) cache. Therefore, the host 300 may first send a request for the router anycast address as, for example, an ARP request. The ARP request is a broadcast packet that is transmitted across the DCE network on the broadcast tree. Since the set of routers is part of an emulated anycast switch, only one link into the emulated anycast switch receives the ARP request. This may be accomplished by, for example, coordination between edge switches connected to a particular emulated switch. The link on which the request is sent is connected to a single router, despite the fact that the router may be a part of an emulated switch.

The router that receives the ARP request may ARP reply by sending a unicast packet to the ARP requesting host. This allows the first-hop switch, directly connected to the host, to know the edge switch associated with the router. This edge switch may be identified according to the switch identification associated with the emulated anycast switch. The ARP reply may be sent with the source MAC address equal to the router anycast MAC address so that the edge switches, directly connected to the hosts, associate the MAC address with the emulated anycast switch.

At this point the host's off subnet traffic will find the shortest path to the emulated anycast switch. This may or may not be the same router that replied to the ARP request. For example, while router 306 may have responded to the ARP request, the path to router 308 may actually be the shortest path for traffic. Other hosts will find their own shortest paths to the emulated anycast switch, which may be through a different router. This effectively load balances between the redundant routers in the emulated switch. Additionally, if the connection to a particular router goes down, either by a topology change in the network or the router itself goes down, traffic is quickly rerouted to other routers. This is because a protocol, such as DCE, used in a network containing layer 2 switches, can discover topology changes or downed links much faster than a hot standby routing protocol such as HSRP, VRRP or GLBP. A solution is provided that takes advantage of this fact to perform failover much quicker than prior art solutions since failover can now be performed by the network of switches itself.

Figure 4:
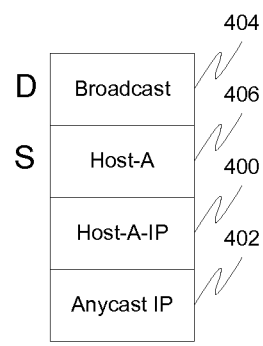
FIG. 4 illustrates an example of an ARP request packet.

Assume host A 300 wants to discover a MAC address for one of the routers 306, 308. It may transmit the ARP packet depicted in FIG. 4. The IP source address 400 may be the IP address of A. The IP destination address 402 may be the anycast IP address of SW7. The Layer 2 destination address 404 of the packet may be set to broadcast (all addresses). The layer 2 source address 406 may be Host-A 406.

Figure 5:
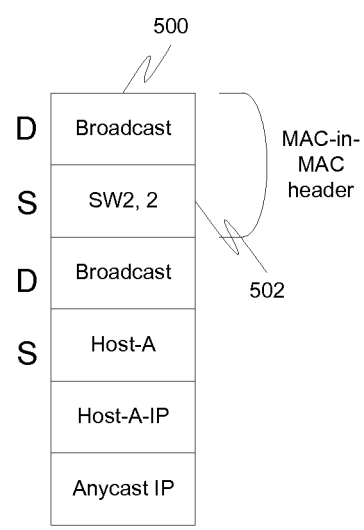
FIG. 5 illustrates an example of an ARP request packet with an appended MAC-in-MAC header.
Figure 6:
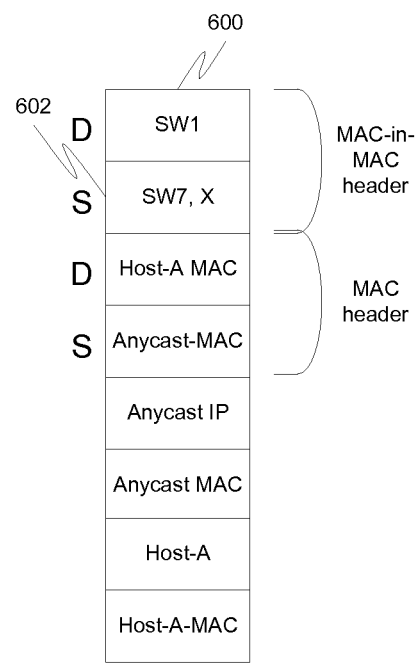
FIG. 6 illustrates an example of an ARP reply packet with an appended MAC-in-MAC header.

Upon receipt of the ARP packet from Host A 302, switch SW1 304 learns Host A 300 is off a particular interface (for example, interface 2). It may then append the MAC-in-MAC header depicted in FIG. 5. Here, the destination 500 may be set to broadcast, since the packet is still an ARP request, while the source may be set to SW2, 2, indicating switch 2, interface 2. A loop-free broadcast tree may be built which includes emulated SW5, and thus the tree indicates the shortest path to emulated SW7 302 (this may have been performed earlier in the process than the receipt of the ARP request). The ARP request may then be passed via the shortest path to emulated switch SW7. However, edge switch SW5 310, recognizing that the next switch is an emulated switch, may strip the MAC-in-MAC header. One of the routers 306, 308 may receive the ARP request and respond with an ARP reply. Here, it is assumed that this would be router 308. Upon receiving the ARP reply, edge switch SW5 310 may add a MAC-in-MAC header to arrive at the packet depicted in FIG. 6. The destination address 600 of the MAC-in-MAC header in the reply may be SW1. The source address 602 of the MAC-in-MAC header of the reply may be emulated switch SW7. An interface identification may also be included but such a value is irrelevant anyway since the packet is not going to be used to perform forwarding. Edge switch SW5 310 may then learn that router 308 is on its interface (e.g., interface 2). This information may be synchronized with information on switches throughout the DCE network, so that each switch knows that router 308 is on the interface of edge switch SW5 310. The ARP reply may then flow through switches 312, 304 to host A 300.

When host 300 then wishes to send normal traffic out through the anycast hardware address corresponding to emulated switch SW7 302, SW2 304 may receive the traffic. It may then look up the anycast hardware address in its table, finding that it is on emulated switch SW7. It then may add the MAC-in-MAC header to the traffic and forward it via the shortest path to emulated switch SW7. Once again, edge switch 310 recognizes that switch SW7 is an emulated switch and strips the MAC-in-MAC header off prior to forwarding it on. By doing so, routers 306 and 308 have been load balanced because a packet originating from host A 300 will be transmitted through router 308 (using the shortest path) while a packet originating from sever B 314 will be transmitted through router 306. In cases where both paths are equal, a tie-breaking mechanism may be used such as hashing based on the source address. Additionally, as stated above, if one link goes down, the DCE network is able to forward all packets to the other router until such time as the link is restored.

Figure 7:
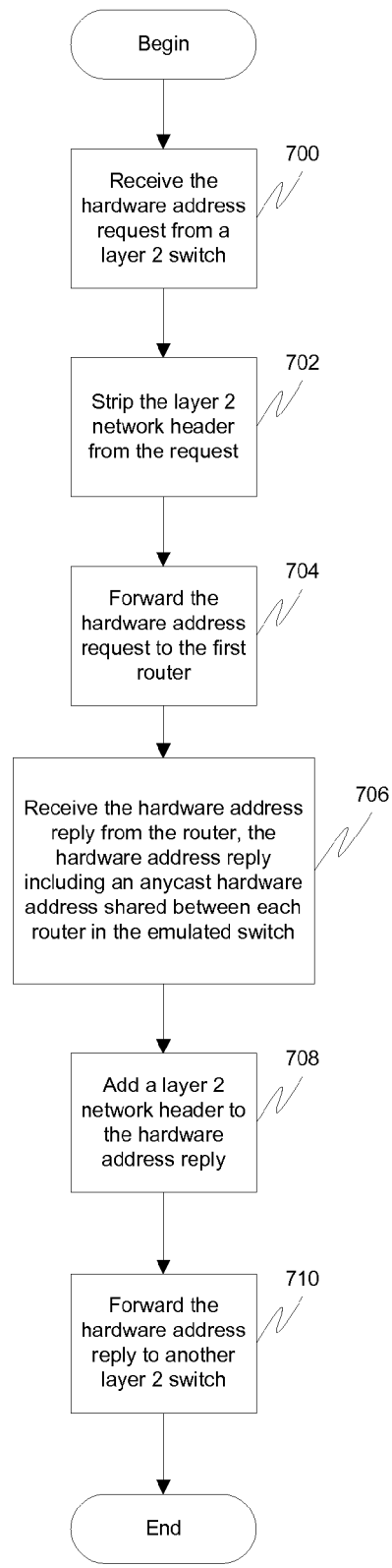
FIG. 7 illustrates an example method for handling a hardware address request to a router in an emulated switch of two or more routers.

FIG. 7 illustrates an example method for handling a hardware address request, such as an ARP request or an IPv6 Neighbor Solicitation, to a first router in an emulated switch of two or more routers. This process may be performed at a layer 2 edge switch in a network containing layer 2 switches. At 700, the hardware address request may be received from a layer 2 switch. This request may be an ARP request and may include a layer 2 network header (e.g., MAC-in-MAC header) that was added to the request by another layer 2 switch (not necessarily the layer 2 switch from which the request was directly received). At 702, this layer 2 network header may be stripped from the request. At 704, the hardware address request may be forwarded to the first router. It does not matter which router within the emulated switch is designated as the first router. At 706, a hardware address reply may be received from the router. This reply may be an ARP reply and may include an anycast hardware address shared between each router in the emulated switch. At 708, a layer 2 network header, such as a MAC-in-MAC header, may be added to the hardware address reply. At 710, the hardware address reply may be forwarded to another layer 2 switch. This may or may not be the same layer 2 switch as in 700.

Figure 8:
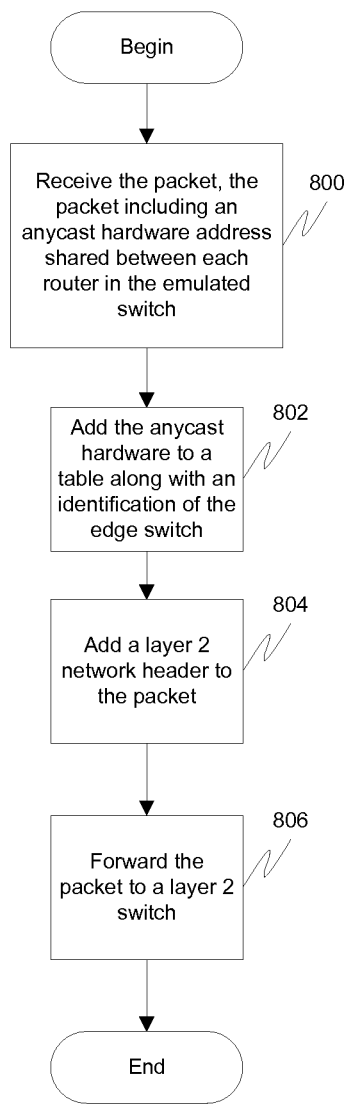
FIG. 8 illustrates an example method for handling a packet received at a layer 2 edge switch from a router in an emulated switch of two or more routers.

FIG. 8 illustrates an example method for handling a packet received at a layer 2 edge switch from a router in an emulated switch of two or more routers. At 800, the packet may be received. The packet may be an ARP reply but it could also be ordinary traffic. The packet may include an anycast hardware address shared between each router in the emulated switch. At 802, the anycast hardware address may be added to a table along with an identification of the edge switch. This table may be periodically synchronized with tables associated with other layer 2 switches in the network. At 804, a layer 2 network header, such as a MAC-in-MAC header, may be added to the packet. At 806, the packet may be forwarded to another layer 2 switch in the network.

Figure 9:
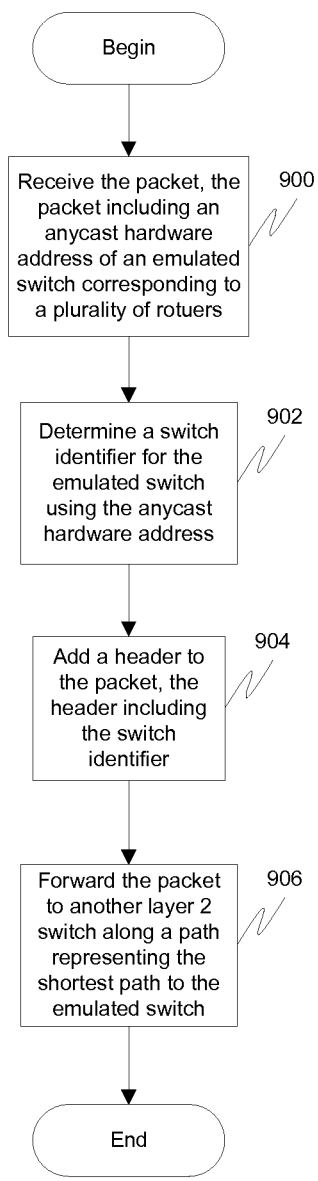
FIG. 9 illustrates an example method for handling a packet from a host at an edge switch in a network containing layer 2 switches.

FIG. 9 illustrates an example method for handling a packet from a host at an edge switch in a network containing layer 2 switches. At 900, the packet may be received. The packet may include an anycast hardware address of an emulated switch corresponding to a plurality of routers. At 902, a switch identifier may be determined for the emulated switch using the anycast hardware address. This may be determined by, for example, looking up the anycast hardware address in a table to retrieve the switch identifier. At 904, a header may be added to the packet, the header including the switch identifier. This header may be a layer 2 network header, such as a MAC-in-MAC header. At 906, the packet may be forwarded to another layer 2 switch along the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

Figure 10:
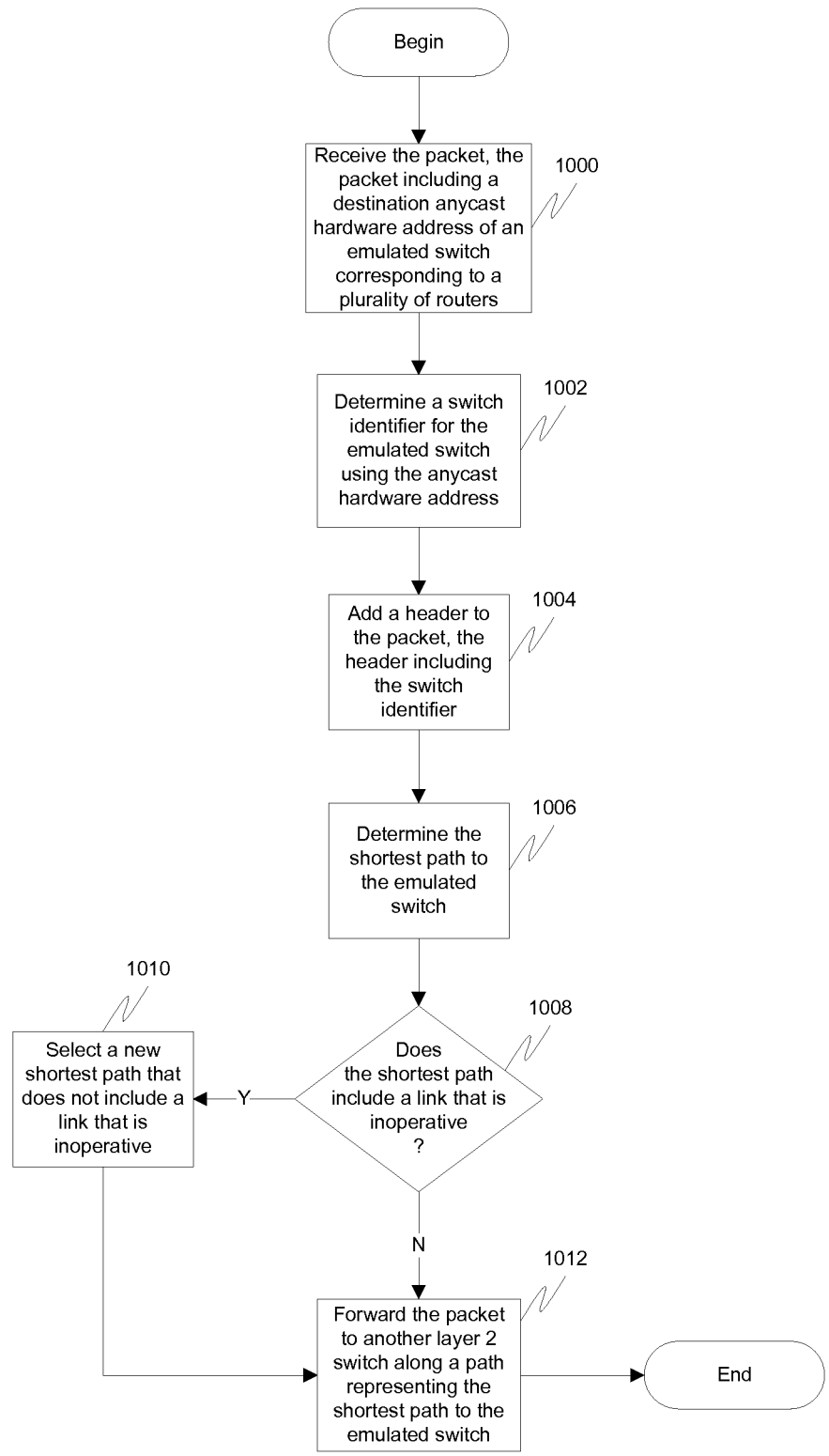
FIG. 10 illustrates an example method for handling a packet from a host at an edge switch in a network containing layer 2 switches.

FIG. 10 illustrates an example method for handling a packet from a host at an edge switch in a network containing layer 2 switches. At 1000, the packet may be received. The packet may include a destination anycast hardware address of an emulated switch corresponding to a plurality of routers. At 1002, a switch identifier may be determined for the emulated switch using the anycast hardware address. This may be determined by, for example, looking up the anycast hardware address in a table to retrieve the switch identifier. At 1004, a header may be added to the packet, the header including the switch identifier. This header may be a layer 2 network header, such as a MAC-in-MAC header. At 1006, a shortest path to the emulated switch may be determined. At 1008, it may be determined if the shortest path includes a link that is inoperative. If so, then at 1010, a new shortest path may be selected that does not include a link that is inoperative. At 1012, the packet may be forwarded to another layer 2 switch along a path representing the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

Figure 11:
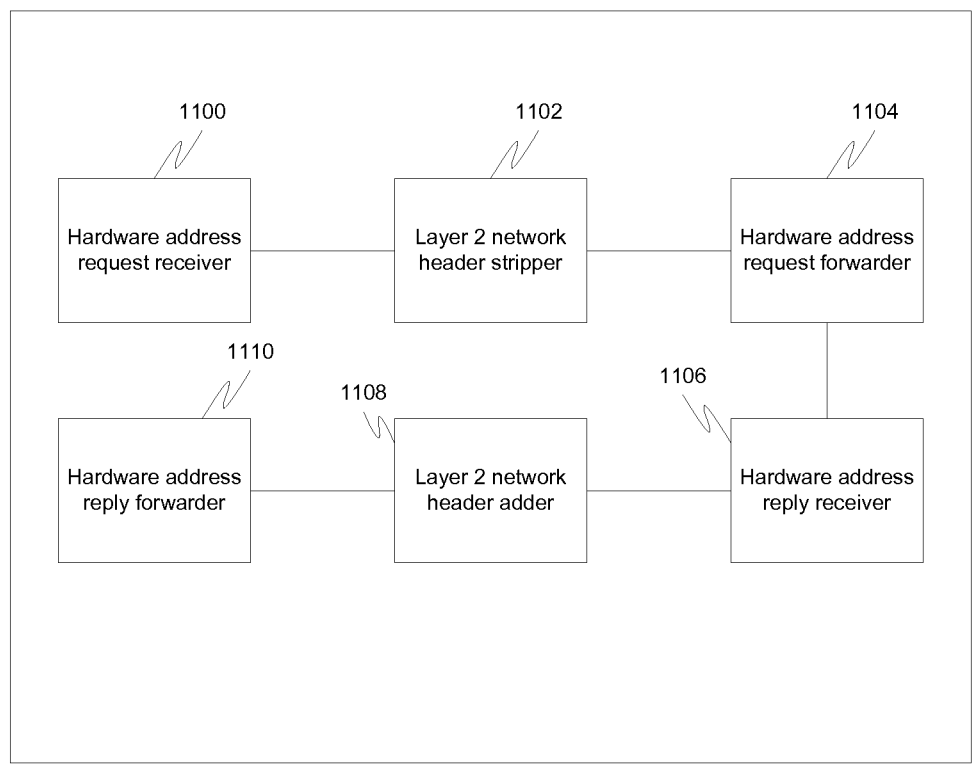
FIG. 11 illustrates an example apparatus for handling a hardware address request to a router in an emulated switch of two or more routers.

FIG. 11 illustrates an example apparatus for handling a hardware address request to a first router in an emulated switch of two or more routers. This apparatus may be a layer 2 edge switch or a portion of a layer 2 edge switch (e.g., software). A hardware address request receiver 1100 may receive the hardware address request from a layer 2 switch. This request may be an ARP request and may include a layer 2 network header (e.g., MAC-in-MAC header) that was added to the request by another layer 2 switch (not necessarily the layer 2 switch from which the request was directly received). A layer 2 network header stripper 1102 coupled to the hardware address request receiver 1100 may strip this layer 2 network header from the request. A hardware address request forwarder 1104 coupled to the layer 2 network header stripper 1102 may forward the hardware address request to the first router. It does not matter which router within the emulated switch is designated as the first router. A hardware address reply receiver 1106 may receive a hardware address reply from the router. This reply may be an ARP reply and may include an anycast hardware address shared between each router in the emulated switch. A layer 2 network header adder 1108 coupled to the hardware address reply receiver 1106 may add a layer 2 network header, such as a MAC-in-MAC header, to the hardware address reply. A hardware address reply forwarder 1110 coupled to the layer 2 network header adder 1108 may forward the hardware address to another layer 2 switch. This may or may not be the same layer 2 switch as before.

Figure 12:
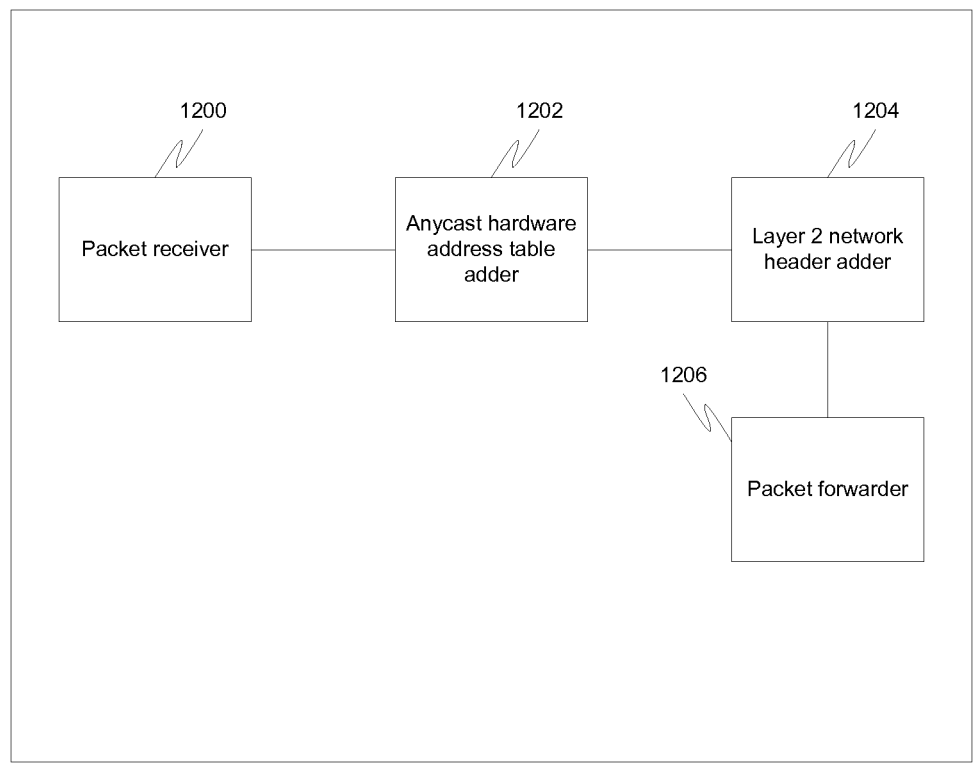
FIG. 12 illustrates an example apparatus for handling a packet received at a layer 2 edge switch from a router in an emulated switch of two or more routers.

FIG. 12 illustrates an example apparatus for handling a packet received at a layer 2 edge switch from a router in an emulated switch of two or more routers. A packet receiver 1200 may receive the packet. The packet may be an ARP reply but it could also be ordinary traffic. The packet may include an anycast hardware address shared between each router in the emulated switch. An anycast hardware address table adder 1202 coupled to the packet receiver 1200 may add the anycast hardware address request to a table along with an identification of the edge switch. This table may be periodically synchronized with tables associated with other layer 2 switches in the network. A layer 2 network header adder 1204 coupled to the anycast hardware address table adder 1202 may add a layer 2 network header, such as a MAC-in-MAC header, to the packet. A packet forwarder 1206 coupled to the layer 2 network header adder 1204 may forward the packet to a layer 2 switch in the network.

Figure 13:
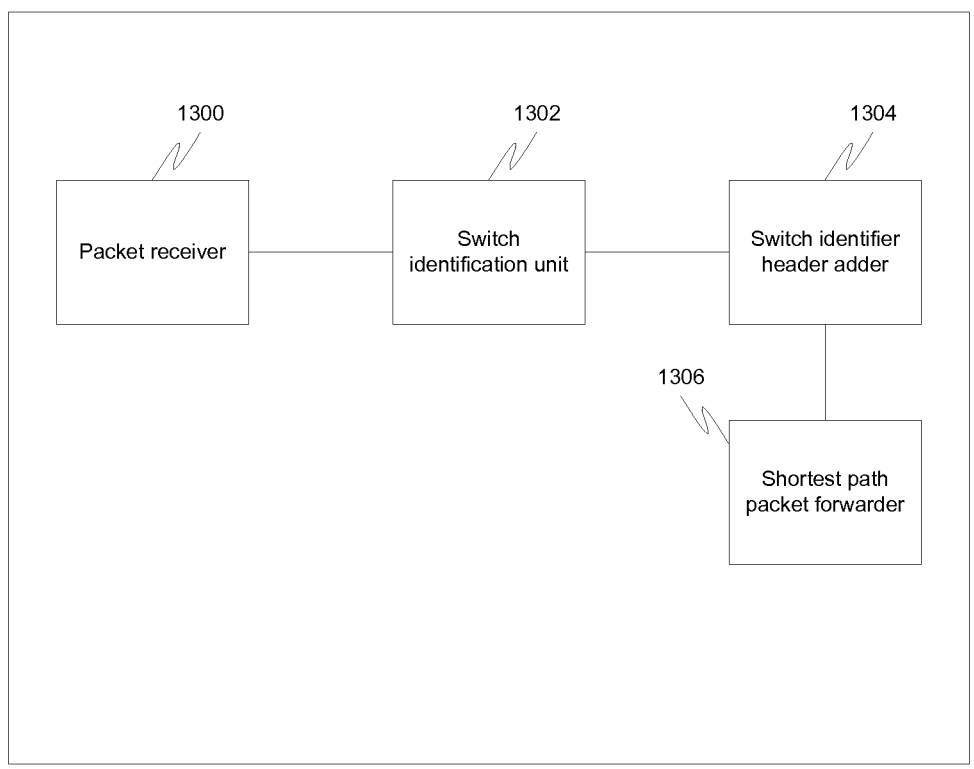
FIG. 13 illustrates an example apparatus for handling a packet from a host at an edge switch in a network containing layer 2 switches.

FIG. 13 illustrates an example apparatus for handling a packet from a host at an edge switch in a network containing layer 2 switches. A packet receiver 1300 may receive the packet. The packet may include an anycast hardware address of an emulated switch corresponding to a plurality of routers. A switch identification unit 1302 coupled to the packet receiver 1300 may determine a switch identifier for the emulated switch using the anycast hardware address. This may be determined by, for example, looking up the anycast hardware address in a table to retrieve the switch identifier. A switch identifier header adder 1304 coupled to the switch identification unit 1302 may add a header to the packet, the header including the switch identifier. This header may be a layer 2 network header, such as a MAC-in-MAC header. A shortest path packet forwarder 1306 coupled to the switch identifier header adder 1304 may forward the packet to another layer 2 switch along a path representing the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

Figure 14:
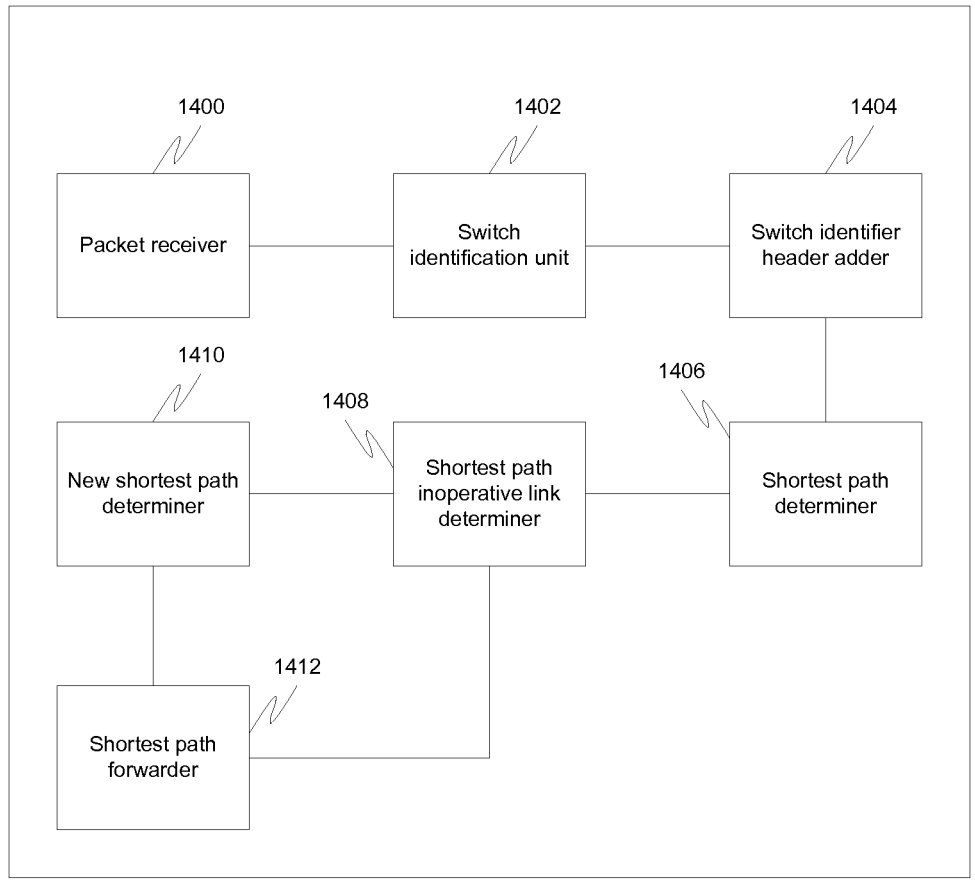
FIG. 14 illustrates an example apparatus for handling a packet from a host at an edge switch in a network containing layer 2 switches.

FIG. 14 illustrates an example apparatus for handling a packet from a host at an edge switch in a network containing layer 2 switches. A packet receiver 1400 may receive the packet. The packet may include a destination anycast hardware address of an emulated switch corresponding to a plurality of routers. A switch identification unit 1402 coupled to the packet receiver 1400 may determine a switch identifier for the emulated switch using the anycast hardware address. This may be determined by, for example, looking up the anycast hardware address in a table to retrieve the switch identifier. A switch identifier header adder 1404 coupled to the switch identification unit 1402 may add a header to the packet, the header including the switch identifier. This header may be a layer 2 network header, such as a MAC-in-MAC header. A shortest path determiner 1406 coupled to the switch identifier header adder may determine a shortest path to the emulated switch. A shortest path inoperative link determiner 1408 coupled to the shortest path determiner 1406 may determine if the shortest path includes a link that is inoperative. If so, then a new shortest path determiner 1410 coupled to the shortest path inoperative link determiner may select a new shortest path that does not include a link that is inoperative. A shortest path packet forwarder 1412 coupled to the shortest path inoperative link determiner 1408 and the new shortest path determiner 1410 may forward the packet to another layer 2 switch via a path representing the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

In each of these embodiments, various protocols may be used (for example, DCE using the IS-IS protocol). Additionally, in each of these embodiments, it is no longer necessary to run a hot standby routing protocol.

Figure 15:
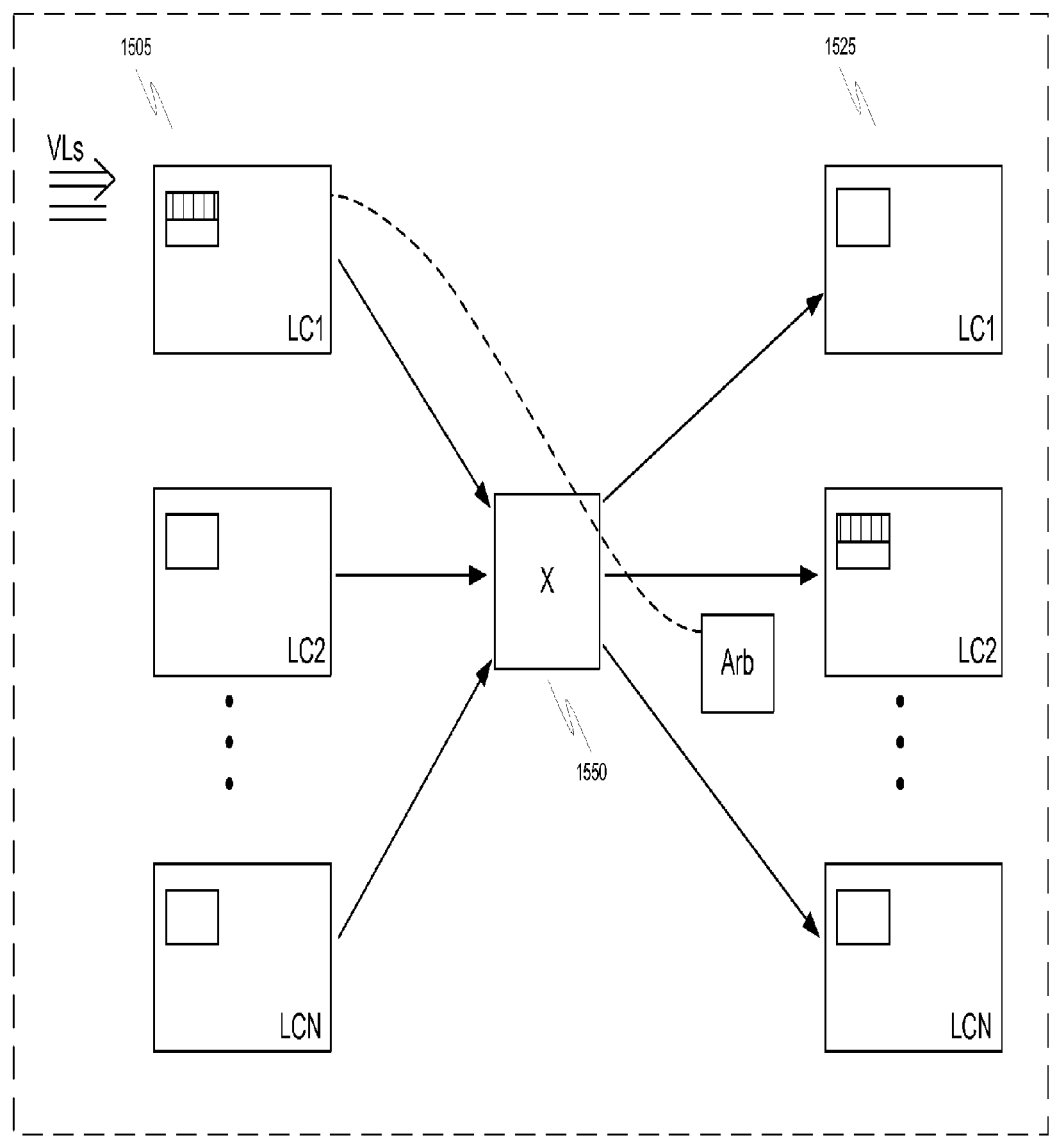
FIG. 15 illustrates a simplified architecture of DCE switch.

FIG. 15 illustrates a simplified architecture of DCE switch 1500. DCE switch 1500 includes N line cards, each of which characterized by and ingress side (or input) 1205 and an egress side (or output) 1525. Line card ingress sides 1505 are connected via switching fabric 1550, which includes a crossbar in this example, to line card egress sides 1525. In this embodiment, one or more of the processes described above is performed by one or more of the line cards.

Although illustrative embodiments and applications of this invention are shown and described herein, many variations and modifications are possible which remain within the concept, scope, and spirit of the invention, and these variations would become clear to those of ordinary skill in the art after perusal of this application. For example, it is possible that an edge switch is connected to multiple routers within a single emulated switch. Accordingly, the embodiments described are to be considered as illustrative and not restrictive, and the invention is not to be limited to the details given herein, but may be modified within the scope and equivalents of the appended claims.

We claim:

1. An apparatus, comprising:
a processor; and
a memory, at least one of the processor or the memory being adapted for:
receiving an address request at a first layer 2 switch from a second layer 2 switch, wherein the address request is directed to an emulated switch, wherein the emulated switch comprises a plurality of routers, wherein each of the routers of the emulated switch is assigned a same address;
forwarding the address request to a first one of the routers of the emulated switch;
receiving an address reply from the first router, the address reply including an address that corresponds to the same address that is assigned to each of the routers of the emulated switch; and
transmitting the address reply.

2. The apparatus of claim 1, at least one of the processor or the memory being adapted for performing steps, further comprising:
adding the address to a table along with an identification of the first layer 2 switch.

3. The apparatus of claim 2, at least one of the processor or the memory being adapted for performing steps, further comprising:
synchronizing the table with one or more tables associated with one or more layer 2 switches other than the first layer 2 switch.

4. The apparatus of claim 1, wherein transmitting the address reply comprises forwarding the address reply to a third layer 2 switch, wherein the first layer 2 switch, the second layer 2 switch, and the third layer 2 switch belong to a same network that includes a plurality of layer 2 switches that include the first, second, and third layer 2 switches, and wherein each of the routers of the emulated switch is configured as a layer 3 gateway device of the same network for forwarding data between devices of this same network and devices outside this same network, via one or more of the switches of this same network.

5. The apparatus of claim 1, wherein the routers do not run a redundancy protocol.

6. The apparatus of claim 1, wherein the same address is a Media Access Controller (MAC) address.

7. The apparatus of claim 1, at least one of the processor or the memory being further adapted for performing steps, comprising:
adding a layer 2 network header to the address reply prior to transmitting the address reply.

8. The apparatus of claim 1, wherein the first layer 2 switch is an edge switch that has an interface with at least one of the routers of the emulated switch.

9. The apparatus of claim 1, wherein the address is an anycast address shared between each router in the emulated switch.

10. A method, comprising:
receiving an address request at a first layer 2 switch from a second layer 2 switch, wherein the address request is directed to an emulated switch, wherein the emulated switch comprises a plurality of routers, wherein each of the routers of the emulated switch is assigned a same address;
forwarding the address request to a first one of the routers of the emulated switch;
receiving an address reply from the first router, the address reply including an address that corresponds to the same address that is assigned to each of the routers of the emulated switch; and
transmitting the address reply.

11. The method of claim 10, further comprising adding the address to a table along with an identification of the first layer 2 switch.

12. The method of claim 11, further comprising synchronizing the table with one or more tables associated with one or more layer 2 switches other than the first layer 2 switch.

13. The method of claim 10, wherein transmitting the address reply comprises forwarding the address reply to a third layer 2 switch, wherein the first layer 2 switch, the second layer 2 switch, and the third layer 2 switch belong to a same network that includes a plurality of layer 2 switches that include the first, second, and third layer 2 switches, and wherein each of the routers of the emulated switch is configured as a layer 3 gateway device of the same network for forwarding data between devices of this same network and devices outside this same network, via one or more of the switches of this same network.

14. The method of claim 10, wherein the first layer 2 switch is an edge switch that has an interface with at least one of the routers of the emulated switch.

15. The method of claim 10, wherein the address is an anycast address shared between each router in the emulated switch.

16. Software encoded on a non-transitory memory, the software including instructions that when executed are operable to:
receive an address request at a first layer 2 switch from a second layer 2 switch, wherein the address request is directed to an emulated switch, wherein the emulated switch comprises a plurality of routers, wherein each of the routers of the emulated switch is assigned a same address;
forward the address request to a first one of the routers of the emulated switch;
receiving an address reply from the first router, the address reply including an address that corresponds to the same address that is assigned to each of the routers of the emulated switch; and
transmit the address reply.

17. The software of claim 16, wherein the first layer 2 switch is an edge switch that has an interface with at least one of the routers of the emulated switch.

18. The software of claim 16, wherein the address is an anycast address shared between each router in the emulated switch.

19. The software of claim 16, further comprising instructions that when executed are operable to add the address to a table along with an identification of the first layer 2 switch.

20. The software of claim 19, further comprising instructions that when executed are operable to synchronize the table with one or more tables associated with one or more layer 2 switches other than the first layer 2 switch.

* * * * *